US009930988B2

(12) United States Patent
Chalk et al.

(10) Patent No.: US 9,930,988 B2
(45) Date of Patent: Apr. 3, 2018

(54) PORTAFILTER FOR CAPSULE

(71) Applicant: BREVILLE PTY LIMITED, Alexandria, New South Wales (AU)

(72) Inventors: Simon James Chalk, Redfern (AU); Gerard Andrew White, Darlington (AU); David Gubbin, Richmond (GB)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 178 days.

(21) Appl. No.: 14/422,699

(22) PCT Filed: Aug. 7, 2013

(86) PCT No.: PCT/AU2013/000872
§ 371 (c)(1),
(2) Date: Feb. 19, 2015

(87) PCT Pub. No.: WO2014/028963
PCT Pub. Date: Feb. 27, 2014

(65) Prior Publication Data
US 2015/0230652 A1    Aug. 20, 2015

(30) Foreign Application Priority Data

Aug. 21, 2012  (AU) .................................. 2012903600

(51) Int. Cl.
*A47J 31/42*    (2006.01)
*A47J 31/40*    (2006.01)
(52) U.S. Cl.
CPC ............. *A47J 31/407* (2013.01); *A47J 31/42* (2013.01)

(58) Field of Classification Search
CPC ................................ A47J 31/407; A47J 31/42
See application file for complete search history.

(56) References Cited

U.S. PATENT DOCUMENTS

| 3,599,557 | A | * | 8/1971 | Leal | A47J 31/0663 99/302 R |
| 4,429,623 | A | * | 2/1984 | Illy | A47J 31/0668 99/295 |
| 4,505,191 | A | * | 3/1985 | Longo | A47J 31/0657 99/300 |
| 4,534,858 | A | * | 8/1985 | Aldrich | A47J 43/22 209/236 |
| 4,644,856 | A | * | 2/1987 | Borgmann | A47J 31/4464 210/455 |
| 4,882,982 | A | * | 11/1989 | Muttoni | A47J 31/0605 99/295 |
| 5,267,506 | A | * | 12/1993 | Cai | A47J 31/30 99/280 |
| 5,327,815 | A | * | 7/1994 | Fond | A47J 31/0668 99/295 |

(Continued)

FOREIGN PATENT DOCUMENTS

| EP | 1774879 A1 | 4/2007 |
| EP | 2356928 A1 | 8/2011 |

*Primary Examiner* — Sean Michalski
(74) *Attorney, Agent, or Firm* — Marshall, Gerstein & Borun LLP

(57) ABSTRACT

Accordingly, there is provided a portafilter having an internal compartment that is adapted to receive a capsule. In one embodiment, an upper compartment has a puncturing component that is free to rotate.

14 Claims, 14 Drawing Sheets

(56) References Cited

U.S. PATENT DOCUMENTS

| | | | | |
|---|---|---|---|---|
| 5,392,694 A * | 2/1995 | Muller | A47J 31/36 | 99/295 |
| 5,398,595 A * | 3/1995 | Fond | A47J 31/0668 | 99/295 |
| 5,463,933 A * | 11/1995 | Landais | A47J 31/0657 | 99/285 |
| D366,180 S * | 1/1996 | Littmann | A47J 31/0657 | D7/309 |
| 5,531,152 A * | 7/1996 | Gardosi | A47J 31/368 | 99/289 R |
| 5,638,741 A * | 6/1997 | Cisaria | A47J 31/0684 | 99/295 |
| 5,642,656 A * | 7/1997 | Braendle | A47J 31/0663 | 99/295 |
| 6,026,732 A * | 2/2000 | Kollep | A47J 31/0668 | 99/295 |
| 6,481,338 B1 * | 11/2002 | Wai | A47J 31/0663 | 99/302 R |
| 7,093,533 B2 * | 8/2006 | Tebo, Jr. | A47J 31/0647 | 99/300 |
| 7,213,505 B2 * | 5/2007 | Kollep | A47J 31/005 | 99/281 |
| 7,806,043 B2 * | 10/2010 | Zanetti | A47J 31/0668 | 99/295 |
| 7,886,654 B2 * | 2/2011 | Hiron | A47J 31/0678 | 99/295 |
| 7,993,691 B2 * | 8/2011 | Yoakim | B65D 85/8043 | 426/112 |
| 8,088,423 B2 * | 1/2012 | Ohresser | A23F 5/08 | 426/433 |
| 8,109,200 B2 * | 2/2012 | Hansen | A47J 31/0673 | 99/279 |
| 8,304,006 B2 * | 11/2012 | Yoakim | A47J 31/0678 | 426/112 |
| 2004/0079237 A1 * | 4/2004 | Denisart | A47J 31/36 | 99/275 |
| 2005/0241486 A1 * | 11/2005 | Hug | A47J 31/402 | 99/275 |
| 2006/0112830 A1 * | 6/2006 | Pasquini | A47J 31/3671 | 99/275 |
| 2009/0029021 A1 * | 1/2009 | Nielsen | A47J 31/32 | 426/433 |
| 2009/0155422 A1 * | 6/2009 | Ozanne | A47J 31/0615 | 426/89 |
| 2009/0205503 A1 * | 8/2009 | Cortese | A47J 31/3628 | 99/295 |
| 2010/0011965 A1 * | 1/2010 | Turi | A47J 31/369 | 99/289 R |
| 2010/0159109 A1 * | 6/2010 | Van Puijenbroek | A47J 31/0668 | 426/594 |
| 2010/0206177 A1 * | 8/2010 | Ricotti | A47J 31/0673 | 99/295 |
| 2010/0288132 A1 * | 11/2010 | Gavillet | A47J 31/3628 | 99/295 |
| 2011/0000377 A1 * | 1/2011 | Favre | A47J 31/3628 | 99/289 R |
| 2012/0297987 A1 * | 11/2012 | Lee | A47J 31/0663 | 99/286 |
| 2013/0327222 A1 * | 12/2013 | Mahlich | A47J 31/3628 | 99/295 |
| 2014/0013958 A1 * | 1/2014 | Krasne | A47J 31/407 | 99/284 |
| 2016/0051079 A1 * | 2/2016 | Abegglen | A47J 31/3623 | 426/394 |
| 2016/0297659 A1 * | 10/2016 | Minnier | A47J 31/0673 | |

* cited by examiner

PORTAFILTER FOR CAPSULE

FIELD OF THE INVENTION

The invention relates to a portafilter and more particularly to a portafilter adapted to receive a pre-packaged dose of ground coffee such as a beverage capsule or a pod.

BACKGROUND OF THE INVENTION

Any discussion of the prior art throughout the specification should in no way be considered as an admission that such prior art is widely known or forms part of the common general knowledge in the field.

Commercial and domestic espresso making machines are well known. A conventional espresso maker has a portafilter with a handle. The portafilter receives ground coffee and can be removably coupled to the group head of the espresso machine. Hot water dispensed by the group head flows through the coffee in the portafilter and exits the portafilter into a cup or other container.

Some espresso or coffee making machines utilise a capsule or a pod. A capsule for coffee is a container within which is a pre-packaged dose of ground coffee. The container of a capsule typically has a radially extending flange or rim to which is sealed a rupturable membrane. The membrane may be fabricated from metal foil. Coffee makers that utilise the capsule have not in the past used a portafilter. Instead, the capsule is inserted into a compartment of the coffee machine and the compartment is closed. Closing of the compartment results in the penetration of the capsule's container. Thereafter, water is introduced into the capsule under pressure. The resulting water pressure ruptures the membrane. Thereafter, water can flow through the capsule.

A pod is a permeable, closed, textile container or envelope that contains coffee grounds. Water can flow through a pod and the coffee in it.

Because some users of conventional espresso making machines may wish to use a capsule or a pod, the present technology provides a solution.

Further, there are many kinds of espresso making machines and consequently many kinds of portafilters. Accordingly, a portafilter for pods and capsules is required that can be used on a variety of different espresso making machines.

OBJECTS AND SUMMARY OF THE INVENTION

It is an object of the technology to provide a portafilter than can receive and utilise a capsule.

It is an object of the technology to provide a portafilter than can receive and utilise a pod.

It is another object of the technology to provide a portafilter for a pod or a capsule that can be utilised on a variety of different espresso machines.

Accordingly, there is provided a portafilter having an internal compartment that is adapted to receive a capsule. In one embodiment, an upper compartment has a puncturing component that is free to rotate.

In preferred embodiments, the puncturing component rotates and further comprises a central fluid passageway that communicates with the internal compartment.

In other embodiments, adapters are provided that allow the portafilter to be used with a variety of different group heads.

In other embodiments of the invention, a diffuser plate is interposed between the compartment and the exit opening of the portafilter.

In yet other embodiments of the invention, the upper capsule compartment component or housing is released from the portafilter by a latch having an actuator that passes through the handle of the portafilter.

In another embodiment a portafilter has a removeable upper portion that removeably retains a pod.

In some embodiments, an upper portion is locked in place, but detachable when a latch contained in the portafilter's handle is retracted. The upper portion is adapted to remain on the group head when the lower portion of the portafilter is removed.

BRIEF DESCRIPTION OF THE DRAWING FIGURES

In order that the invention be better understood, reference is now made to the following drawing figures in which.

Figure 4:
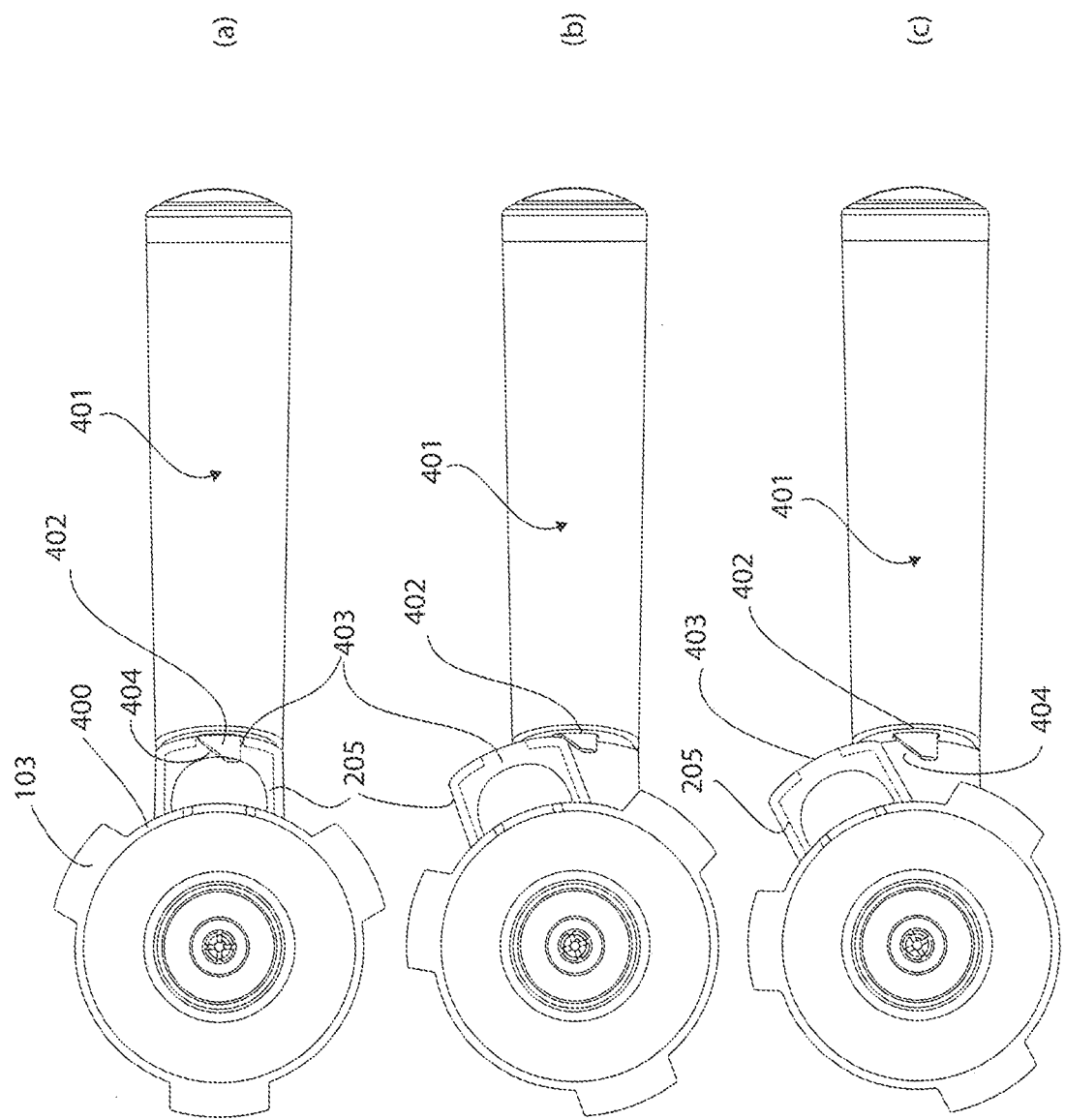

FIG. 4 (a) (b) (c) are top plan views of a portafilter.

Figure 5:
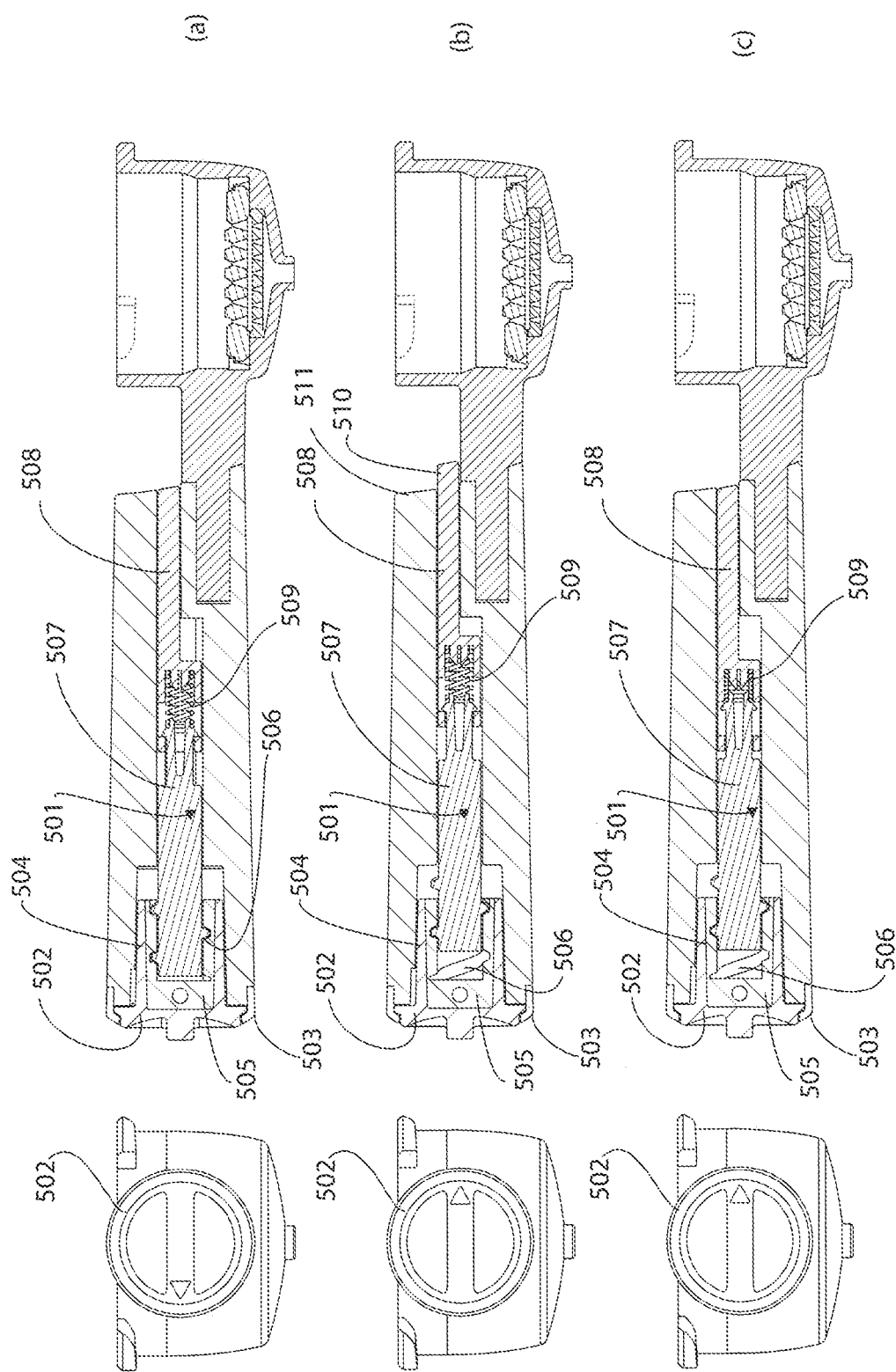

FIG. 5 (a) (b) (c) are cross sections of a portafilter

Figure 6:
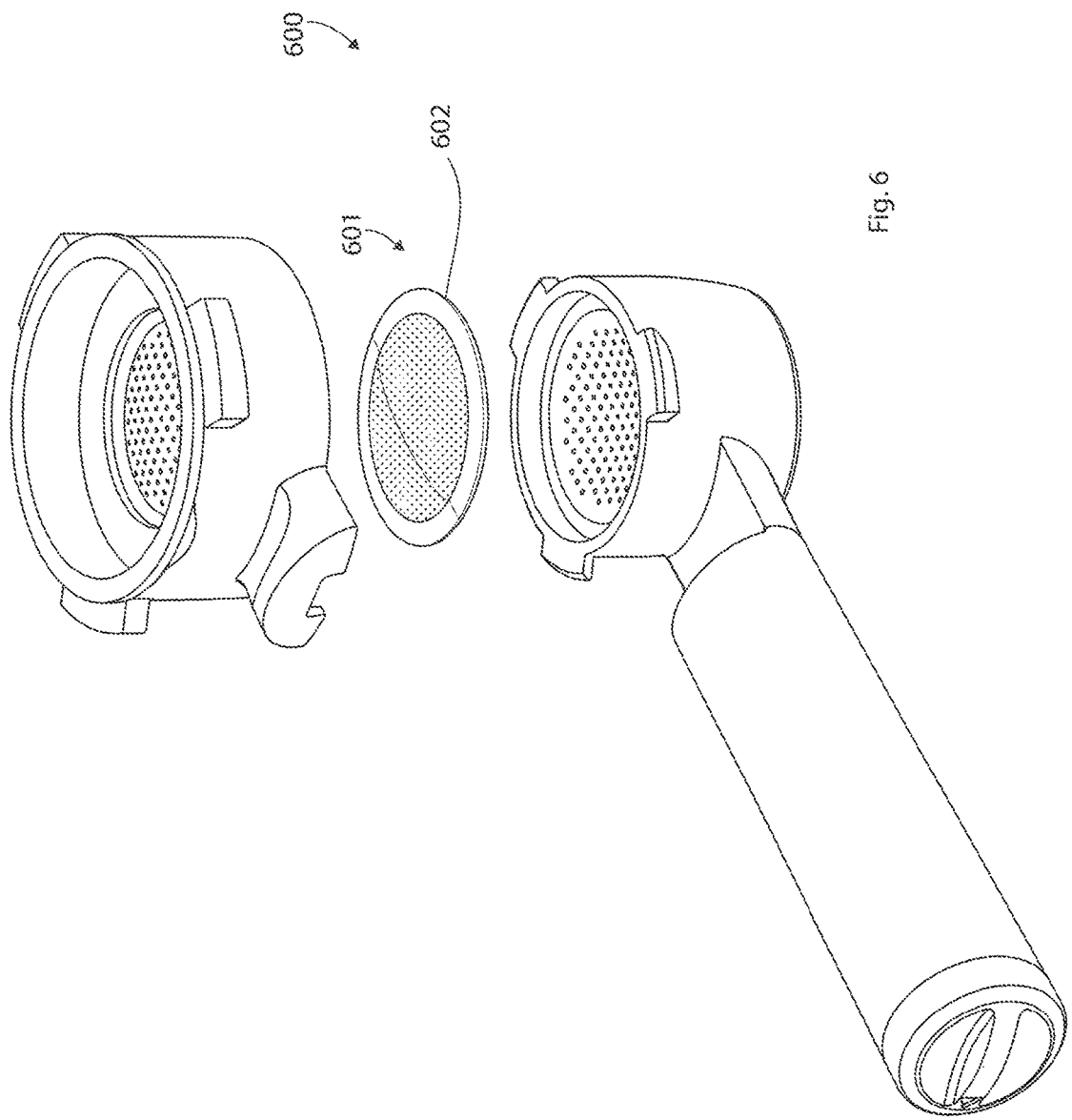

FIG. 6 is a prospective view of a portafilter adapted to contain a beverage satchette or pod.

Figure 7:
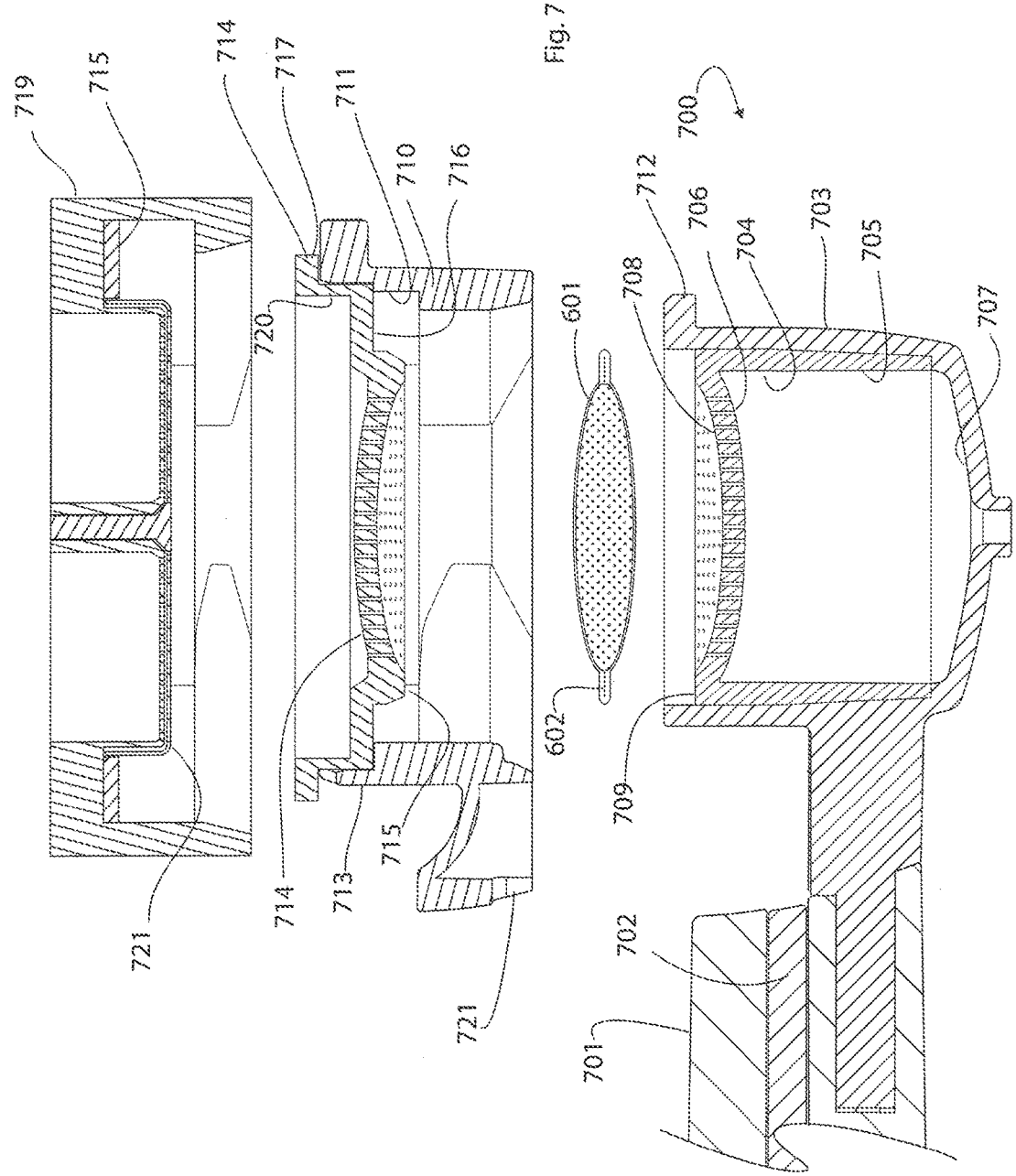

FIG. 7 is a cross sectional view of a device depicted in FIG. 6.

Figure 8:
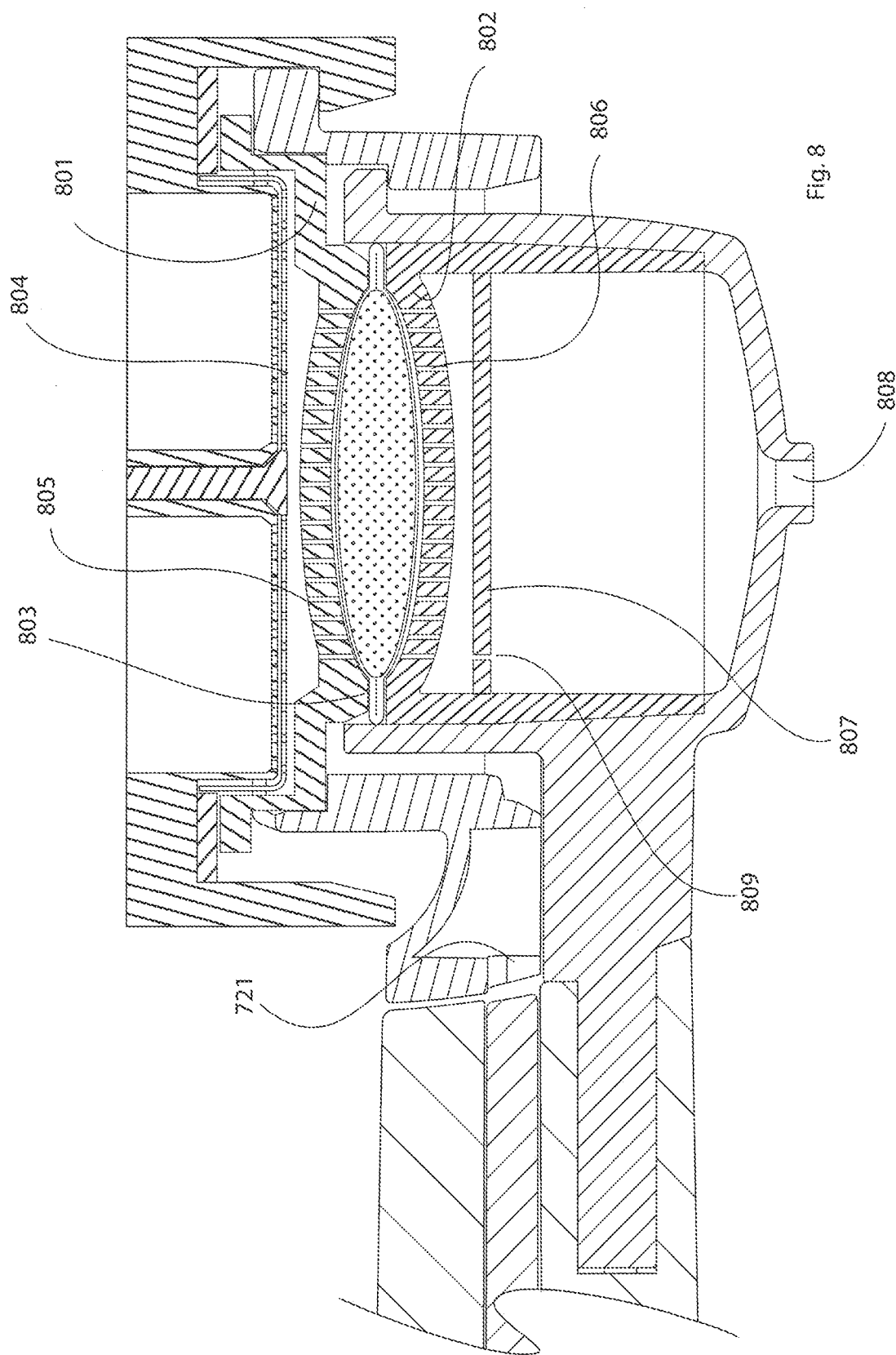

FIG. 8 is another embodiment of a portafilter adapted to contain a satchette or pod.

Figure 9:
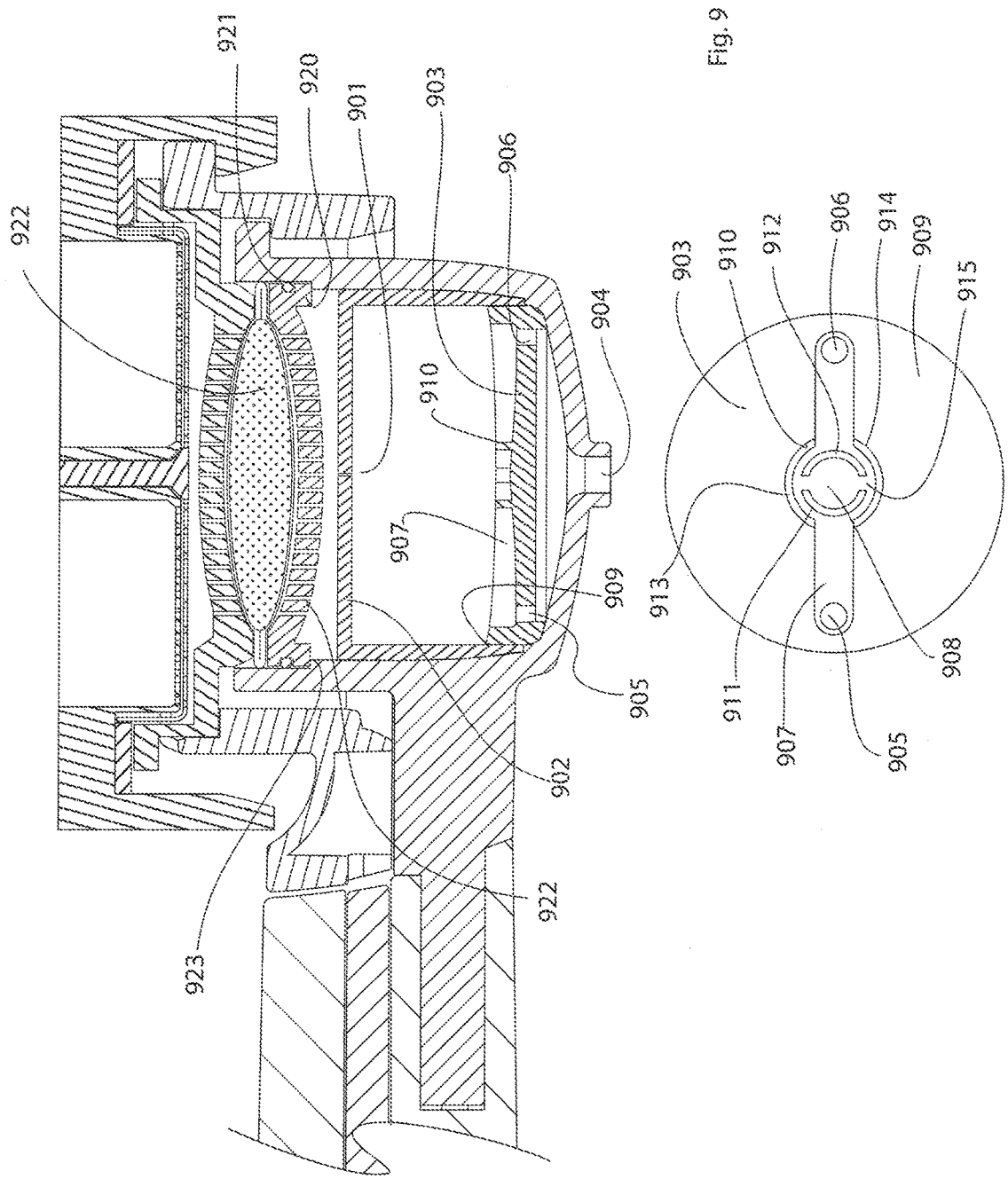

FIG. 9 is a cross section of a portafilter for a satchette or pod having a labyrinth plate.

Figure 10:
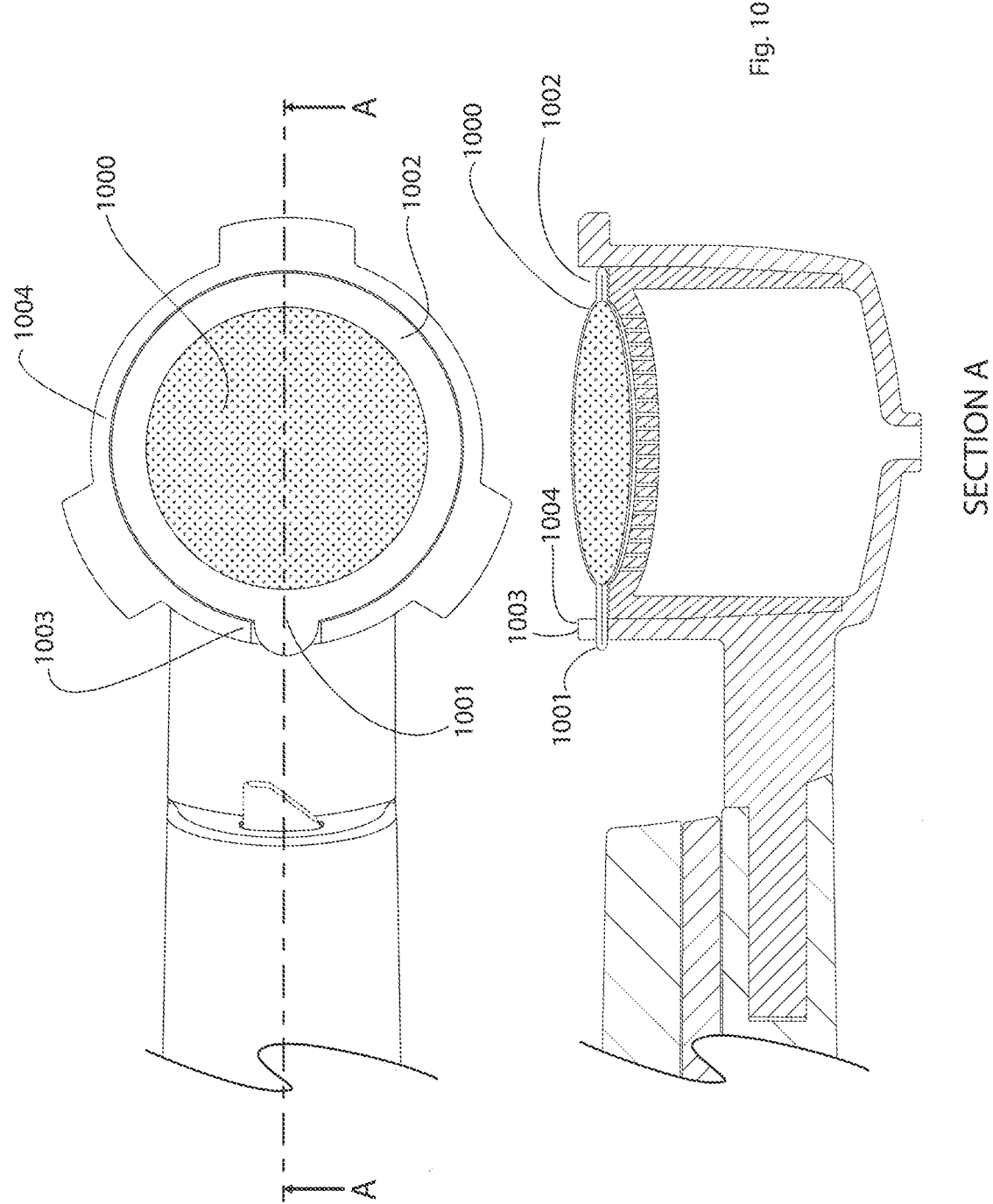

FIG. 10 is a top plan view and a cross section of a lower compartment of a portafilter, showing a satchette with a removal tab.

Figure 11:
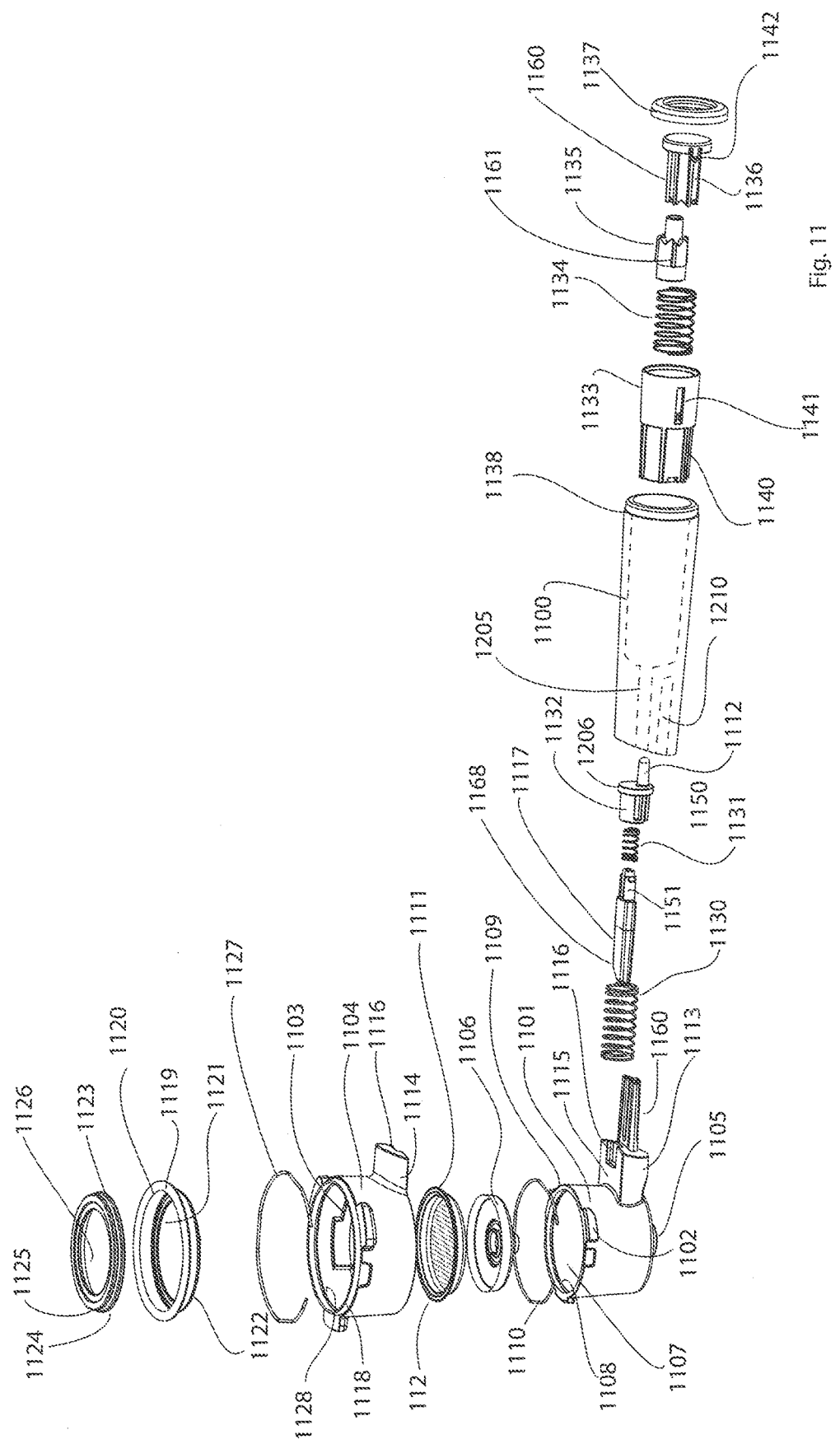

FIG. 11 is an exploded perspective view of a portafilter.

Figure 12:
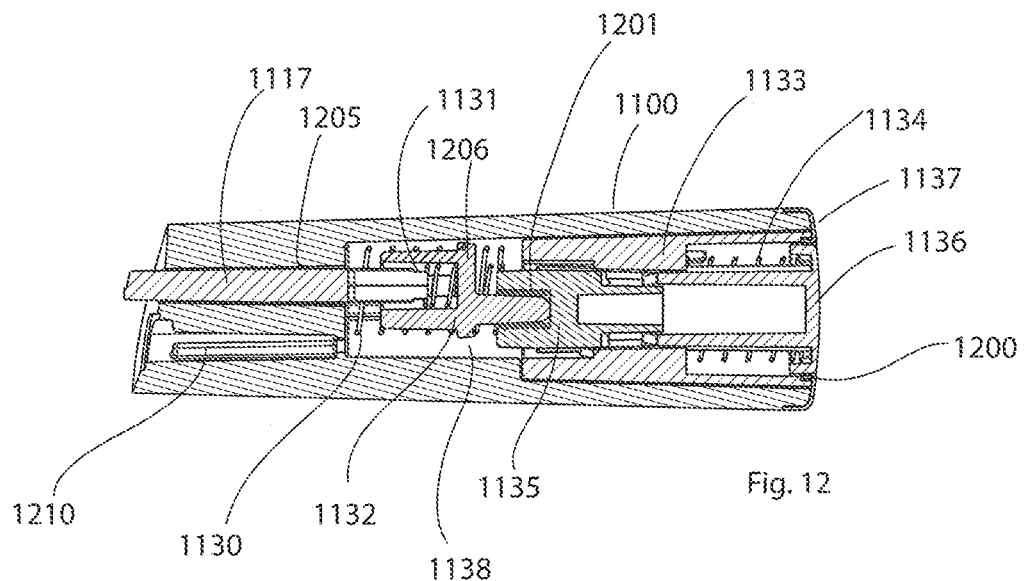

FIG. 12 is cross sectional view of the handle of the portafilter depicted in FIG. 11.

Figure 13:
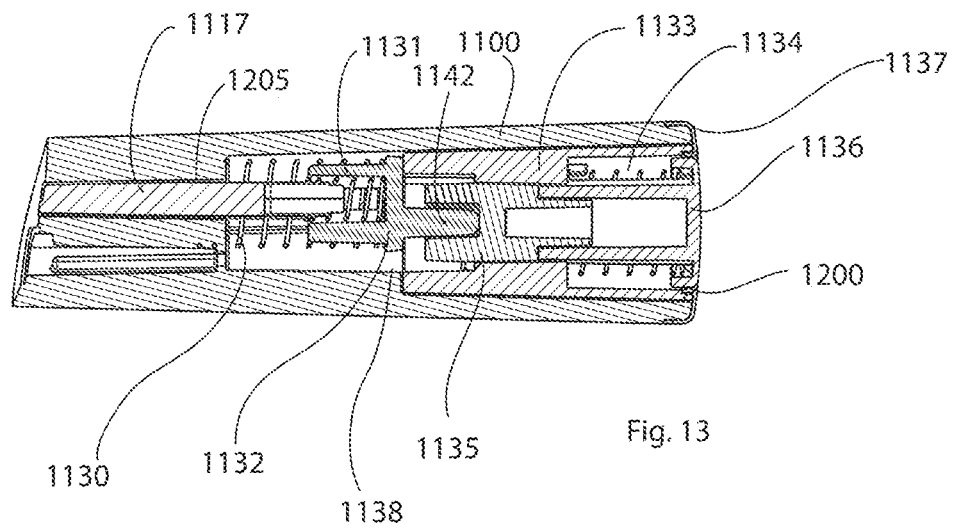

FIG. 13 is a cross sectional view of the handle of the portafilter shown in FIG. 11.

FIGS. 14(a)-(d) are partially cross sectioned views of the handle of the portafilter depicted in FIG. 11, illustrating the indexing of the driving shaft.

Figure 15:
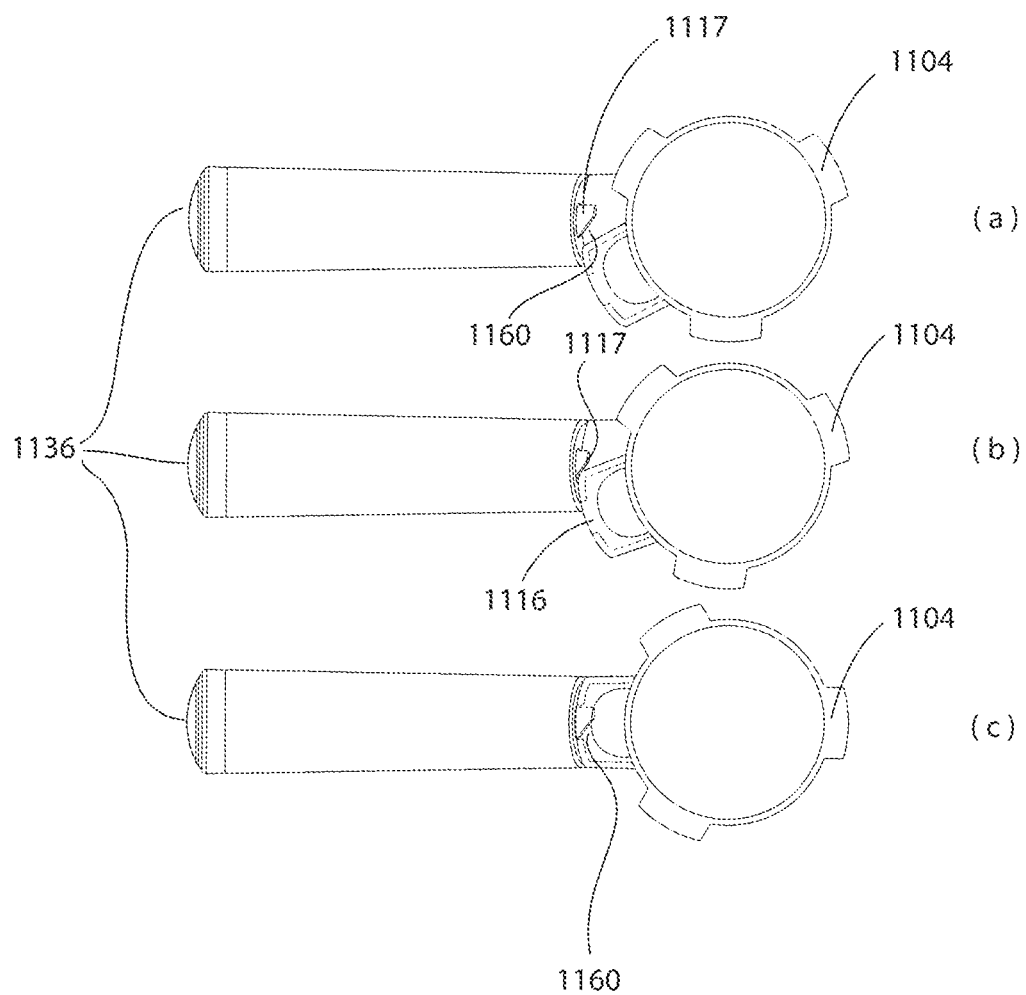

FIGS. 15 (a)-(c) are top plan views illustrating the retraction of the latch by the upper portafilter component.

BEST MODE AND OTHER EMBODIMENTS

Figure 1:
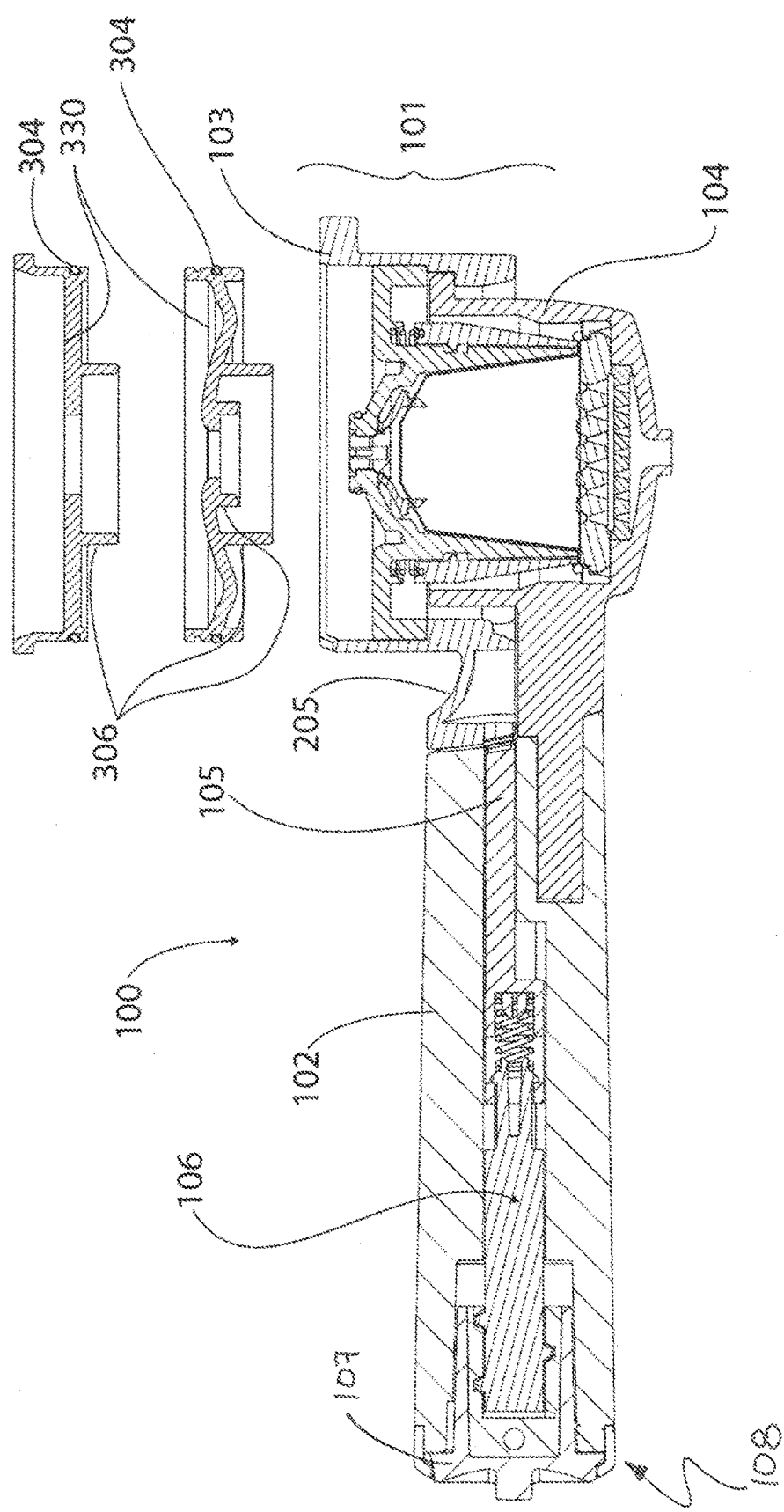
FIG. 1 is a cross sectional view of a portafilter and 2 adaptors.
Figure 3:
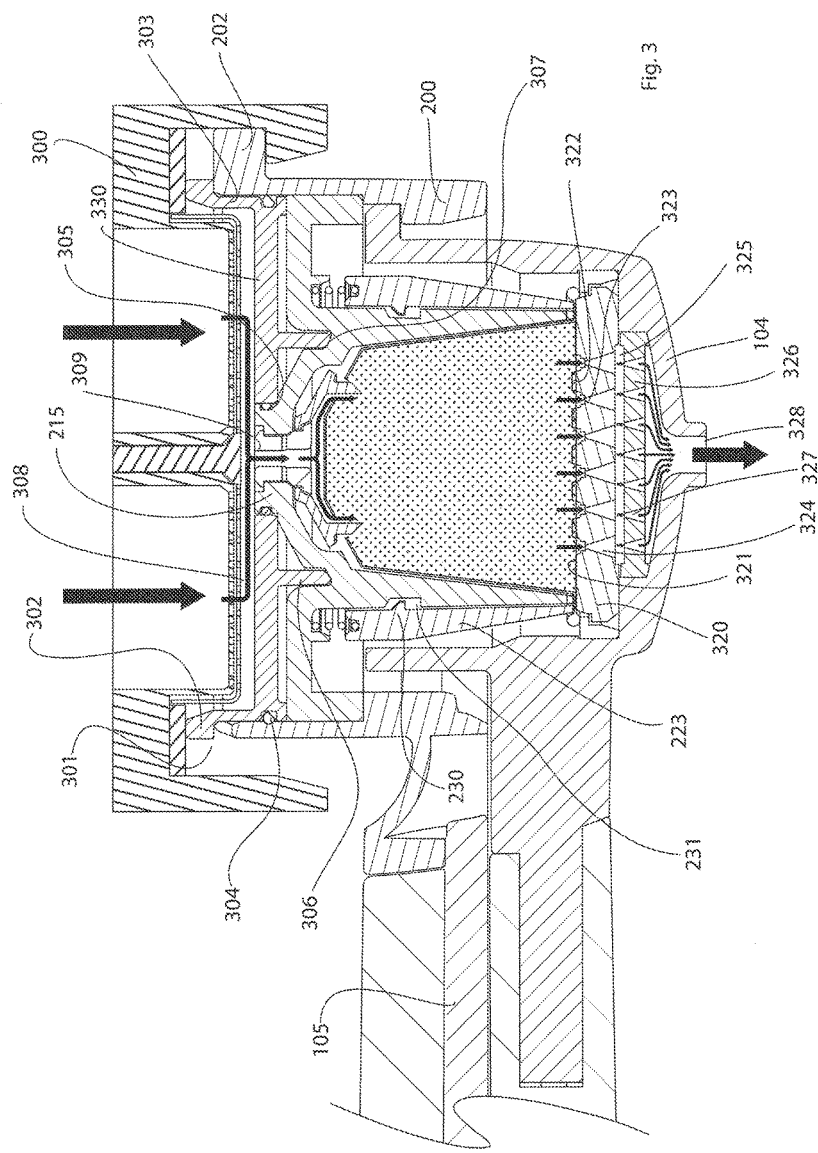
FIG. 3 is a cross section of a portafilter containing a capsule, engaged with a group head.

As shown in FIG. 1, a portafilter 100 for retaining a beverage capsule comprises a capsule compartment 101 that is retained by handle 102. The capsule compartment 101 has an upper compartment component 103 that is removable from a lower compartment 104. The lower compartment component 104 is affixed to the handle 102. The upper and lower compartments have cooperating interlocking bayonet features 350, 351 as shown in FIG. 3. The handle has a latch 105 that is associated with a biasing and retracting mechanism 106 that is located within the handle 102. In this example, a rotating actuator 107 is mounted at the terminal end 108 of the handle. This arrangement allows for the use of interchangeable upper compartments, each one adapted to engage with a different group head yet cooperate with the same lower compartment and handle.

Figure 2:
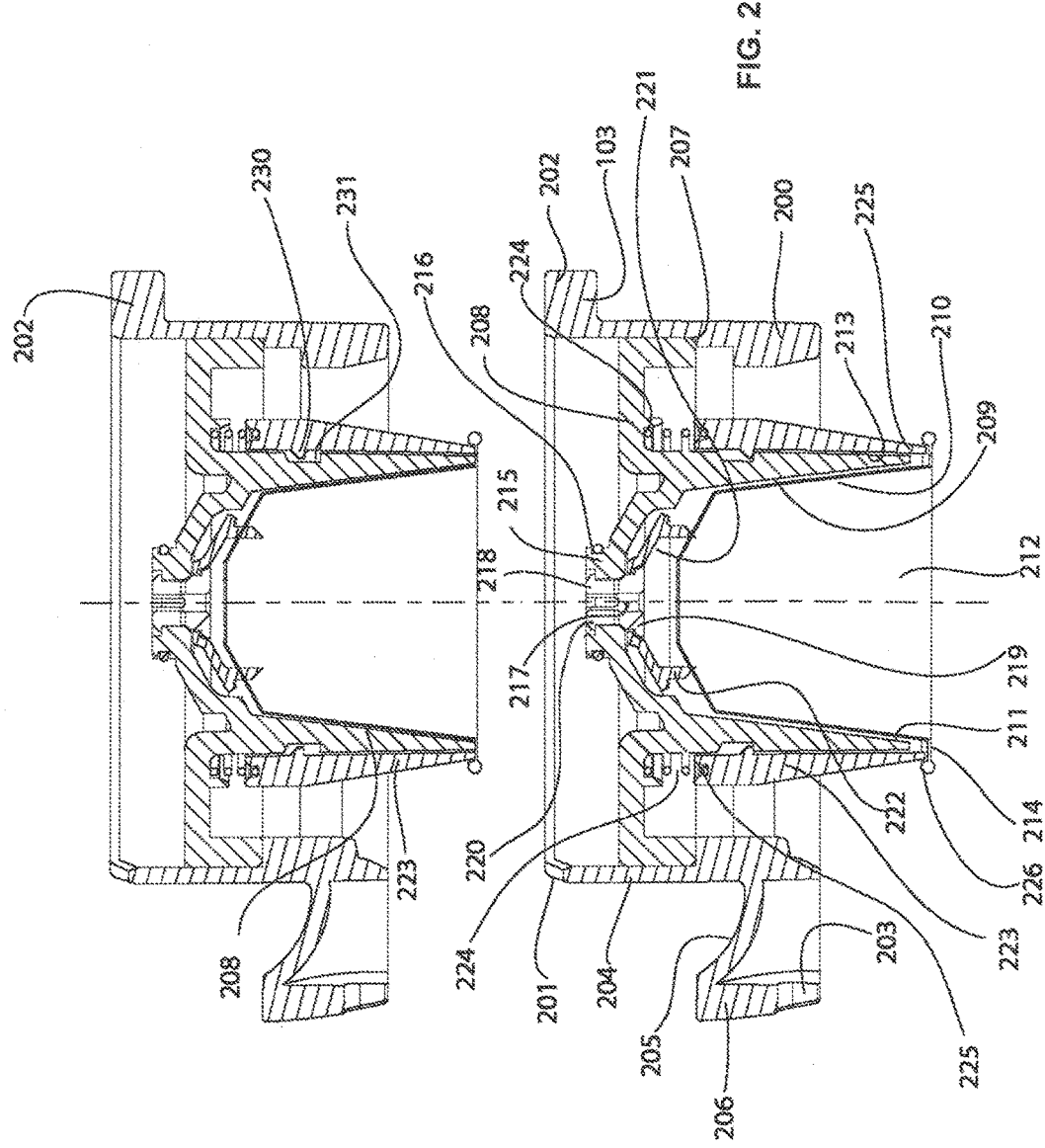
FIG. 2 are cross sections of an upper compartment.

As shown in FIG. 2, the upper component 103 of the capsule compartment 101 comprises a body 200 that incorporates, about its upper rim 201, mechanical features 202 such as male bayonet features that allow the upper component to be removably fitted to the group head of a conventional espresso making machine. Different types and sizes of group heads can be accommodated by alteration of features 202 to suit any particular espresso machine. In this example, the upper component 103 also includes a radial passageway, opening, slot, recess, tunnel or archway 203 for receiving the tip of the latch 105 that is retained by the handle 102. In this example, the passage way 203 is offset from the cylindrical portion 204 of the upper component 103 by a hollow extension 205 having an end wall 206 in which the passageway 203 is formed. When the latch 105 is inserted in the opening 203, the upper and lower compartments will rotate in unison allowing both the upper and lower compartments 103, 104 to be removed horn a given group head as an assembly. When the latch 105 is retracted the upper compartment 103 will remain attached to the group head. This allows the lower compartment 104 to be removed for re-use with a new capsule.

In this example, the upper component 103 has an internal shelf 207 that receives a capsule shroud 208. The capsule shroud 208 is preferably snug fit, press fit to or formed integrally with the upper component 103. The capsule shroud 208 has a tapered internal surface 209 that closely conforms to the tapered shape of a capsule's container. In this example, the internal walls 210 are tapered from a maximum diameter 211 that forms a mouth or opening for the capsule 212 to a smaller diameter located away from the mouth opening 211. The outside diameter 213 of the shroud near the mouth opening 211 is smaller than the affective diameter of the rim 214 of the capsule 212. An upper portion of the shroud forms a neck 215. The neck may incorporate an external and circumferential groove and seal 216 (as will be explained). The neck features a central inlet or passageway 217. In this example, the inlet is adapted to receive a hollow fastener 218. The fastener 218 has a flange 219 at a lower end and a tapered rim 220 at an upper end. A rotating puncture element or disk 221 is retained between the lower flange 219 and the neck 215. The arrangement of fastener 218 and rotating puncture element disk 221 allows the element 221 to rotate freely when contact is made between the one or more descending pins or prongs 222 of the puncture element disk and the container portion of the capsule 212. The pins 222 can puncture a capsule.

In order to prevent the underside of the capsule's rim 214 from adhering to the lower rim of the capsule shroud, a capsule ejection sleeve is optionally provided. The capsule ejection sleeve 223 surrounds the shroud and is biased away from the neck 215 so as to remove or separate the rim 214 from the shroud at the completion of a coffee making operation and when the lower compartment 104 is separated from the upper compartment 103. The ejection sleeve 223 is biased by a compression spring 224 that preferably surrounds the shroud and is interposed between a groove 225 located on the upper end face of the shroud 223 and a groove 224 formed by a descending rim located on an underside of the shroud's major horizontal web. In this example, the ejector sleeve tapers to a narrow edge or rim 225. Thus, the free lower rims of the shroud and the ejector sleeve can both fit within the gap on the underside of the capsule's rim 214. The gap is defined by the annular space between the outside of the container's body and the outermost portion of the capsule's rim 214. In this example, the outer portion of the rim 214 forms a circumferential bead 226. The interior surface of the ejection sleeve 223 is also shown as having an interior, circumferential rim or clip 230 that is located in an external circumferential groove 231 on the capsule shroud 208. Interference between the rim 230 and a lower shoulder of the groove 231 limits the downward travel of the ejection sleeve 223.

As shown in FIG. 3 a group head 300 of an espresso making machine is adapted to cooperate with the bayonet or other fitting 202 formed on the upper rim of the compartment 101. However because the spacing between the compartment 101 and the water permeable screen of the group head 300 can vary from machine to machine, an adaptor ring 301 may be provided. The portafilter may be provided with two or more adaptors 301 so that it may be used with a variety of different espresso machines. The adaptor is preferably a polymeric moulding having an upper flange 302 and a side wall 303 intended to seal against the inner side wall of the upper component 200. The flange sits above the rim 202 of the upper compartment. For this purpose, a circumferential groove and O-ring seal 304 may be provided in the outer surface of the side wall 303. The adaptor further comprises a central opening 305 adapted admit a flow into the upper component and to seal against the o-ring around the neck 215 of the upper compartment 200. The adaptor may have one or more downward facing rims 306. In this example, the rim 306 engages and cooperates with an upward facing circumferential groove 307 formed on an upper portion of the shroud. The purpose of the adaptor is to control the gap between the dispensing openings 308 or screen of the group head 300 and the entry 309 that leads to the interior of the capsule compartment. By doing so, the adaptor channels flow and reduces the dead space or residual volume of the gap between the group head and the upper component without blocking the openings 308. In some embodiments (see FIG. 1) the central membrane or diaphragm 330 of an adapter 301 is contoured to conform to the shape of the discharge screen of a group head.

As further suggested by FIG. 3, the lower compartment 104 contains a plate or disc 320 that causes the capsule's membrane 320 to rupture in a predictable way. An upper surface of the plate 320 comprises, for example, an array of rupture features being for example, raised, mounds or trunrated stepped pyramids 322 between which are located discharge openings 323. The internal pressure causes the membrane to rupture in the area above or around the discharge openings 323. In preferred embodiments, each discharge opening 323 is associated with a preferred tapered discharge nozzle 324. Beverage liquid leaving the discharge nozzle 321 enters a discharge gap 325. An optional diffuse 326 is located below the discharge gap 325. The diffuser comprises a disc or plate in which is formed an array of tapered diffuser openings 327. The diffuser openings 327 taper to a maximum diameter at their discharge. The diffuser openings 327 discharge into a gap or space below the diffuser that leads to the portafilter's primary dispenser 328.

As shown in FIG. 4, the upper compartment 400 rotates or twists out of engagement with the assembly of the handle and lower compartment 401. In order that the upper compartment be retained in the correct orientation, the tip of their handle's retractable latch 105, 402 retracts in to the handle and out of the passageway 403, 203. The tip of the latch 403 is preferably chamfered or tapered on one edge 404 so that the latch does not have to be manually retracted when installing the lower compartment onto the upper compartment. However, as shown in FIGS. 4 and 5, the latch 402 must be manually retracted before the compartments can be separated from one another.

As shown in the example of FIG. 5(a) the handle's latch retraction mechanism 106, 501 comprises a rotating dial 107, 502 that is retained on the free or butt end of the portafilter's handle by a circumferential sleeve 503. In this example the dial 502 has an internal cylinder 504 that contains an insert 503 that incorporates a female thread 506. The threads may be integral with the dial. Accordingly, rotation of the handle causes advancement and retraction of an actuating shaft 507. The actuating shaft 507 is attached to the latch 103, 508 by a compression spring 509. As shown in FIG. 5(a), when the dial 502 is rotated e.g. counter clockwise, the actuating shaft 507, spring 509 and latch 508 retracts, preferably fully within the handle. As shown in FIG. 5 (b) when the dial is rotated clockwise, the actuating shaft 507, spring 509 and latch 508 at advanced until at least a tip 510 protrudes from an opening in a forward surface 511 of the handle. The tip 510 is adapted to engage with the passageway 403. The tip 510 is also adapted to be retracted or displaced to the rear as the latch is rotated into position without user intervention as shown in FIG. 5(c). In this orientation, the dial 502 is in the same orientation as the folly extended orientation depicted in FIG. 5(b). However, as the passageway is rotated into position, the latch 508 can be displaced or retracted relative to the actuating shaft 507 by compressing the spring 509. When the lower and upper compartments are aligned and the opening passageway 203 aligns with the latch 510 the latch will be urged forward by the spring 509 so as to retain the upper compartment and prevent it from rotation independently of the lower compartment.

As shown in FIG. 6(a) portafilter assembly 600 may also be adapted to carry a coffee sachette, pod or other similarly shaped container. A coffee satchette 601 is a lens shaped envelope, commonly formed from a permeable textile. A satchette has a circumferential rim 602 and is filled with ground coffee. A pod is a similar construction, but fabricated from an impermeable material such as an aluminium foil or metalized polymer film. A pod will have regions that will rupture under pressure to permit water to flow through it. The upper compartment 603 may be used in combination with adapters as suggested by FIG. 3.

With further details s shown in FIG. 7, a portafilter 700 for a pod has a handle 701 with a reciprocating latch 702, as previously described. In this example, the lower compartment 703 of the portafilter contains an insert 704 that is preferably snug fit and optionally removable. The insert 704 comprises one or more optional side walls 705 that space the concave and perforated containment plate 706 away from the floor 707 of the portafilter. In this example, the lower containment plate 706 contains a plurality of through openings 708 and is shaped or curved to conform to the shape of a satchette or pod 601. The containment plate has a flat peripheral rim 709 for receiving the flat peripheral rim 602 of the satchette or pod. The upper compartment 710 includes female bayonet features 711 that cooperate with male bayonet features 712 formed around the upper rim of the lower compartment. The upper compartment has a stepped upper rim 713 for removeably receiving an upper containment and adapter plate 714. The upper containment plate has a central curved and perforated portion 714. The upper containment plate or portion 714 has a flat peripheral rim 715 that cooperates with the lower rim 709 so as to clamp the rim 602 of the satchette or pod 601 between the upper and lower containment plates 714, 704. The curved portion and rim of the upper containment plate are surrounded by a circumferential recess 716 that accommodates the male bayonet features 712 of the lower compartment. The upper containment plate also has a circumferential flange 717 that seals against the ring shaped or toroidal landing 715 associated with the group head assembly 719. In is preferred that the upper plate 714 be able to rotate relative to the upper compartment so that pods or sachets are not damaged when the compartments 703, 710 are rotated relative to one another. The major internal diameter 720 of the upper containment plate is large enough to receive the dispensing screen 721 of the group head assembly.

The upper compartment also features a radial passageway 721 that is spaced away from the body of the upper compartment in the manner described, for example, with reference for FIGS. 1, 3 and 4.

As shown in FIG. 8, the upper and lower compartments may be assembled by rotation on to the group head assembly. This has the effect of driving the upper and lower containment plates 801, 802 together so that the rim 803 of the satchette or pod is clamped between the flat rims of the upper and lower containment plates. Pressurised water from the dispersion plate or "shower head" 804 flows only through the perforations 805 in the upper containment plate, then through the satchette or pod and the ground coffee contained in it, then through the perforations 806 in the lower containment plate 802. The lower compartment may contain an optional baffle 807. The baffle 807 spans the flow path between the lower containment plate 802 and the discharge spout 808 of the portafilter. The baffle may contain one or more small through openings 809. The openings slow the flow of coffee to the spout 808, create back pressure and lengthen the flow path and regulate the flow time between the lower perforations 806 and the spout 808. In some embodiments, the baffle 807 contains a single small opening 809 sometimes referred to as a Gagia hole.

As shown in FIG. 9 the opening 901 in the baffle 902 may be centrally located. The baffle 902 may be used in conjunction with a labyrinth 903. The labyrinth 903 comprises a further obstruction to the flow path and further retards the flow of extracted coffee to the discharge spout 904. The labyrinth, in this example, has two diametrically opposed discharge openings at low points in the labyrinth 905, 906 that are interconnected by a transverse channel 907. In this example, the bulb of the discharge from the opening 901 in the battle 902 strikes the centre of the labyrinth 908. The centre 908 is located in the centre of the transverse channel 907. Because the centre 908 and the remaining floor area 909 are higher than the upper rims of the discharge openings 905, 906 brewed coffee will flow from all of the upper surfaces of the labyrinth through the discharge openings 905, 906. The centre 908 is surrounded by one or more upright labyrinth walls 910 in this example, the labyrinth walls 910 comprise an inner pair 911, 912 and an outer pair 913, 914. The inner pair 911, 912 are spaced apart by diametrically opposed gaps 915 that have the effect of changing the direction of flow and channelling brewed coffee into the transverse channel 907, the floor surface of the transverse channel 907 slopes downwardly from the centre 908 toward the discharge openings 905, 906 to promote the flow of coffee toward those openings. The outer walls 913, 914 act to contain the flow of coffee exciting the centre region 908 to the transverse channel 907.

As shown in FIG. 9, the lower containment plate 920 may have a circumferential groove and o-ring seal 921 that assists isolating the flow through the pod or sachette 922 to the perforations 922 in the lower containment plate. In this example, the lower containment plate 920 is supported by a circumferential shoulder 923 formed within the lower compartment. In this way, the lower containment plate may also be removed from the lower compartment.

As shown in FIG. 10, a pod or satchette may have an extension or tab 1001 extending from the rim 1002. The tab 1001 is received within in a slot or gap 1003 formed in an upper rim 1004 of the lower compartment. The tab 1001 allows the satchette or pod to be easily removed after use.

As shown in FIG. 11, a portafilter may be adapted to carry a beverage pod. A pod is a permeable container fabricated from a permeable textile. Pods are generally round and many are sized to fit within the confines of a portafilter of the type illustrated in FIG. 11. A portafilter for a pod has a handle 1100 to which is attached a lower portafilter housing 1101. The lower portafilter housing 1101 has, in this example, male bayonet features 1102 about an upper rim, adapted to cooperate with female bayonet features 1103 located on the inner sidewall of an upper portafilter component 1104. The lower floor of the lower portafilter component 1101 features an opening 1105. Flow through the opening 1105 can be moderated and controlled with a polymer spout insert 1106 that is located in proximity to the floor of the lower portafilter component 1101. The insert 1106 is a disk with a rim and a central discharge opening. The inner sidewall 1107 of the lower portafilter component 1101 has a circumferential groove 1108 located adjacent to the mouth opening 1109. The groove 1108 retains a "C" shaped spring clip 1110, a portion of which extends radially inward of the groove 1108. The retaining clip 1110 removably retains a perforated metafile, single or double walled or other filter element 1111. When it is inserted, the peripheral rim 1112 of the filter element 1111 rests above the mouth opening 1109 of the lower portafilter component.

As previously mentioned the upper and lower portafilter components 1104, 1101 are removably attachable owing to the aforementioned bayonet features. The lower portafilter component has a radially extending stub or protrusion 1113 that cooperates with a radially extending protrusion 1114 on the exterior surface of the upper portafilter component. The protrusion 1114 on the upper portafilter component has a flat underside that cooperates with the flat upper surface 1115 on the protrusion 1113 of the lower portafilter component. Each of the flat surfaces have a similarly configured radial channel 1116, 1116*a*. When the channels are in alignment, they form a blind opening. The opening is adapted to receive the tip of a reciprocating latch 1117. When the latch 1117 is located or inserted in the opening formed by the channels, the upper portafilter component 1104 cannot be rotated relative to the lower portafilter component 1101. The channel 1116*a* in the lower protrusion 1113 contributes to the effectiveness of the latch 1117. When the latch 1117 is retracted or withdrawn, the upper and lower portafilter components are free to rotate relative to one another, allowing the upper component to remain in the group head.

The upper portafilter component 1104 has a stepped upper rim 1118 that receives a pod gasket holder 1119. The gasket holder 1119 has an inverted "U" shaped rim 1120 that covers the stepped rim 1118. It also has an internal peripheral and inward facing flange 1121 located about its lower edge 1122. In operation, a pod is located within the pod gasket holder and is supported from below by the flange 1121 and the filter 1111. Upward movement of the pod is prevented with a polymeric pod gasket 1123 that fits within or is carried by the inward facing flange 1121 of the pod gasket holder. In this example, the pod gasket 1123 comprises a pair of parallel and spaced apart rims 1124, 1125. The flange 1121 fits between the rims 1124, 1125. The lower annular surface 1126 of the pod gasket may be dished so as to make better contact with the pod being retained by it. The pod gasket holder 1119 is optionally retained by a 'C' shaped retaining spring 1127 that is carried by a groove 1128 located on an inner surface of the upper portafilter component, adjacent to the stepped rim 1118.

As will be explained the handle 1100 is hollow and contains the reciprocating latch 1117, a first latch spring 1130, a second latch spring 1131, a spring holder 1132, a button housing 1133, a button spring 1134, a driving shaft 1135, and a button 1136. The button is accessible through a ring-like cover 1137 that is attached to the distal, open end 1138 of the handle 1100.

As shown, in FIGS. 12 and 13, the handle 1100 has a distal opening 1200 that leads to an internal compartment 1138. The internal compartment 1138 receives the button housing 1133. The button housing 1133 has one or more parallel external ribs 1140 that cooperate with the interior of the handle so as to prevent rotation of the button housing 1133. The button housing also has one or more longitudinal slots 1141 that are adapted to receive a like number of cooperating and tabs 1142 formed on the button 1136. When the tabs 1142 are inserted into the slot or slots 1141, the button 1136 is affectively trapped by the button housing and can thereafter only reciprocate. The reciprocating motion of the button 1136 is biased into an extended position by the button spring 1134. When a user disperses the button 1136 with their finger, through the cap 1137, the motion is transferred to the driving shaft 1135. The driving shaft 1135 has an opening 1201 for receiving a finger 1142 that extend axially from the spring holder 1132. The spring holder contains within it, the second latch spring 1131. The second latch spring, biases the reciprocating latch 1117 into an extended position. The latch 1117 is received by and reciprocates within a passageway 1205 formed through the body of the handle that at the end of the handle opposite the button opening 1200. The first latch spring 1130 is a compression spring located within the compartment 1138, between an end wall of the compartment and an enlarged head 1206 formed circumferentially about the spring holder 1132. The spring holder 1132 also has one or more longitudinal slots 1150 that receive cooperating and resilient tabs 1151 that trap one end of the latch 1117 to the spring holder 1132 for reciprocating motion.

As suggested by FIGS. 12 and 13 the reciprocating latch 1117 has two stable positions, one fully extended (FIG. 12) and one fully retracted (FIG. 13). When the button 1136 is pressed fully and allowed to return to its rest position, the orientation of the reciprocating tongue 1117 will change from extended to fully retracted, and vice versa.

The handle has a longitudinal channel 1210 for receiving a mounting tang 1169 that extends from the protrusion 1113 of the lower portafilter housing 1101.

The button housing 1133 has internal step and indexing features that cooperate with the driving shaft 1135 to cause the bi-stable reciprocation of the latch 1117.

Figure 14:
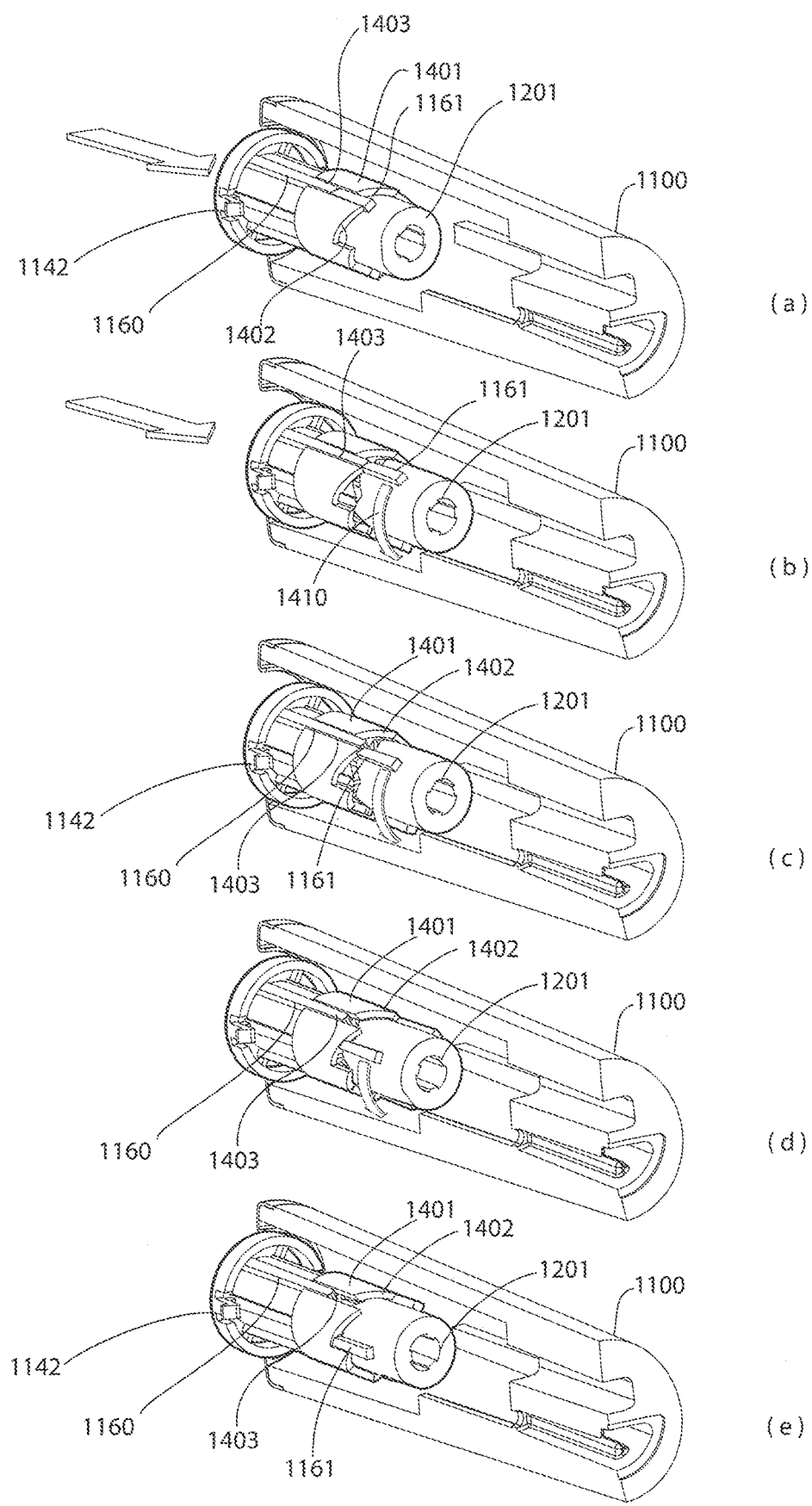

FIG. 14 illustrates the bi-stable reciprocating motion of the driving shaft. In order to better illustrate the reciprocating motion of the driving shaft 1135, the outer shell of the button housing 1133 is not illustrated in FIG. 14. Within the outer shell of the button housing 1133 there is located a circumferential array of internal steps 1401. Each step is angled or swept, so that each step forms a ramp 1402. The steps 1401 are formed in pairs and adjacent pairs of steps are separated by a longitudinal slot 1403. Each slot 1403 is adapted to receive one of the arrays of longitudinal ribs 1160 formed on an exterior surface of the button 1136 as well as one of the longitudinal ribs 1161 formed on an external surface of the driving shaft 1135. The inward facing and outward facing of the ribs 1160 on the button and the ribs 1161 have slanted or angled faces adapted to make surface to surface contact. In the fully retracted position of the reciprocating latch 1117, as shown in FIG. 14 (*a*) the ribs 1160 of the button and the ribs 1161 of the driving shaft 1135 are both contained and slide within a slot that is located between adjacent pairs of steps. When the button 1136 is pressed, the button's ribs 1160 drive the driving shaft's ribs 1161 out of the slot. Because the contacting faces of the ribs are cooperating and slanted, and because the driving shaft 1135 is biased toward the button by the action of the spring holder 1132, the driving shaft will index or rotate as shown in FIG. 14 (*b*). The slanted face of the rib 1161 will maintain contact with the step on to which it is driven (FIGS. 14 (*c*) and (*d*)) and come to rest at the "bottom" of a step, in the fully extended position depicted in FIG. 14 (*e*). Repeated activation of the button 1136 will cause the reciprocating latch 1117 to move between retracted and extended positions.

Even in the extended position and as shown in FIG. 15, the reciprocating tongue 1117 can be retracted by an external force toward the button. That movement is accommodated by the sliding fit between the latch's tabs 1151 operating in conjunction with the receiving slots 1150 in the spring holder 1132. When the external forces are removed, the second latch spring 1131 will return the latch 1117 to its fully extended position. In this way, the upper portafilter housing 1104 can be rotated into engagement with a lower portafilter housing 1101, even when the latch 1117 is folly extended. The latch 1117 may be provided with a chamfered end 1168 so as to allow the upper portafilter housing to more easily displace it as it is rotated into position. Once the protrusions 1114, 1113 are in alignment, with the latch 1117 secured or located in the opening formed by the grooves 1116, further rotation of the housing components is effectively prevent until the latch 1117 is retracted with the operation of the button 1136.

Although the invention has been described with reference to specific examples, it will be appreciated by those skilled in the art that the invention may be embodied, in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A portafilter for attachment to a group head of an espresso making machine, the portafilter being for a pre-packaged container, comprising:
   a handle to which is attached a compartment adapted to receive the container;
   the compartment having a lower component that is attached to the handle and an upper component that is removeably attachable to the lower component;
   the upper component having an upper rim, the upper rim, further comprising mechanical features that enable it to be attached to the group head and a capsule shroud having a neck in which is formed an opening, the opening having below it and around it, a puncture element having descending pins that rotates about the opening.

2. The portafilter of claim 1, wherein:
   the upper component has formed in it a radial opening;
   the handle comprising a reciprocating latch that can be inserted into and withdrawn from the opening.

3. The portafilter of claim 2, wherein:
   the latch is driven by a push-button located at one end of the handle.

4. The portafilter of claim 1, wherein:
   the lower component further comprises a rupture plate having an upper surface having an array rupture features between which are located discharge openings.

5. The portafilter of claim 1, further comprising:
   an ejection sleeve that surrounds the capsule shroud.

6. The portafilter of claim 1, further comprising:
   a first adapter ring having an upper flange that may be located above the upper rim of the upper component and an opening for admitting a flow into the upper component.

7. The portafilter of claim 6, further comprising:
   a second and different adapter ring having an upper flange that may be located above the upper rim of the upper component and having an opening for admitting a flow into the upper component.

8. The portafilter of claim 1, wherein:
   the lower component contains within it a perforated lower containment plate;
   the upper component contains a perforated upper containment plate;

the upper and lower containment plates being shaped to cooperate for receiving a container.

9. The portafilter of claim 8, wherein:
the lower component further comprises a baffle located between the lower containment plate and a discharge spout.

10. The portafilter of claim 1, wherein:
the neck has a central inlet that receives a fastener that retains the puncture element.

11. The portafilter of claim 10, wherein:
the neck has a circumferential groove that carries a seal.

12. The portafilter of claim 11, further comprising:
a second and different containment plate having a flange that locates above the rim of the upper component.

13. The portafilter of claim 10, wherein:
the fastener has a flange at a lower end and a tapered rim at an upper end.

14. The portafilter of claim 13, wherein:
the latch is driven by a push-button located at one end of the handle.

\* \* \* \* \*